July 19, 1932. F. SPIDLA ET AL 1,867,773

TIRE CHAIN

Filed Feb. 19, 1931

INVENTOR

Frank Spidla & Frank J. Hrabal.

Their Attorney.

Patented July 19, 1932

1,867,773

UNITED STATES PATENT OFFICE

FRANK SPIDLA AND FRANK J. HRABAL, OF LIMERICK, SASKATCHEWAN, CANADA

TIRE CHAIN

Application filed February 19, 1931. Serial No. 516,958.

This present invention relates to new and useful improvements in a tire chain.

The primary object of the invention resides in the provision of a tire chain which is highly efficient in use and assures a firm gripping of the surface to prevent skidding of the wheel.

The invention has for another object the provision of a tire chain of the character stated which grips the surface firmly at one side of the wheel and prevents skidding of the wheel in any direction.

The invention has for a further object the provision af a tire chain of the character stated having transverse tread members of improved form which have extended corners at one side of the wheel to assure firm gripping of the surface and prevent side skidding of the wheel.

The invention has for a still further object the provision of a tire chain of the character stated which will assure firm gripping of the surface and prevent skidding of the wheel without danger of injury to a finished smooth road surface.

The invention has for a still further object the provision of a tire chain of the character stated particularly designed for use when travelling over snow or ice surfaces to cause a firm gripping on the surface and prevent skidding of the wheel thereon particularly in a transverse direction.

The invention has for a still further object the provision of a tire chain of the character stated which is of improved and simplified construction as well as highly efficient in use and may be readily mounted on the wheel and adjusted thereon or removed from the wheel, as desired; the construction of the entire chain being such as to permit the same to be manufactured at small cost and retailed at a popular price with good profit, thus providing a commercially attractive proposition.

To the accomplishment of these and related objects as shall become apparent as the description proceeds, our invention resides in the construction, combination and arrangement of parts as shall be hereinafter more fully described, illustrated in the accompanying drawing and pointed out in the claims hereunto appended.

The invention will be best understood and can be more clearly described when reference is had to the drawing forming a part of this disclosure, wherein like characters indicate like parts throughout the several views.

In the drawing:—

Figure 1:
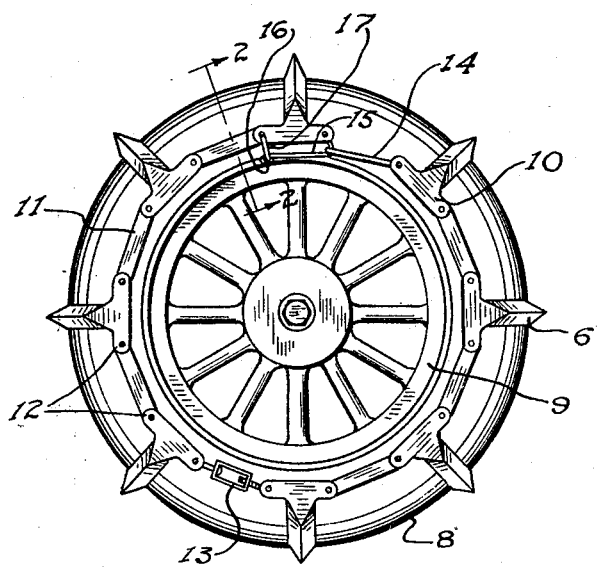
Figure 1 is a side elevation of a wheel with the improved tire chain mounted over the tire thereof.
Figure 2:
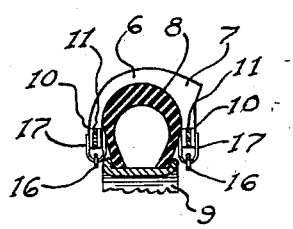
Figure 2 is a transverse section, taken substantially on the plane of line 2—2 of Figure 1, looking in the direction indicated by the arrows.
Figure 3:
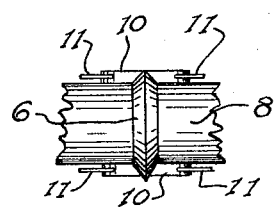
Figure 3 is a fragmentary plan, looking at the tread of the tire and showing one of the transverse tread members mounted across the same.

Referring more in detail to the drawing, it is to be noted that the tire chain includes a plurality of transverse tread members 6 of arcuate form and triangular in cross section. Each tread member 6 is enlarged and extended near one end to provide the corner projection 7 at one side of the tire 8 carried on the wheel 9 over which the tire chain is positioned. Each end of the tread members 6 is flattened and extended in opposite directions to produce a pair of oppositely extended arms 10, the outer extremities of which are bifurcated to receive an end of links 11 which serve to connect the opposed arms 10 of adjacent transverse tread members 6, the arms 10 and links 11 being connected together by pivot members 12 extended therethrough, such as rivets or the like. The flattened ends and arms 10 of the transverse tread members 6 and their connecting links 11 serve as side chains extending around the sides of the tire 8, on opposite sides of the wheel 9.

In order to adjust the tire chain to the proper size for the wheel and tire on which it is to be employed, a turn-buckle connection 13 is provided between opposed arms 10 of two of the transverse tread members 6 on each side of the tire chain structure, in place of the simple connecting link 11. At another location on each side of the tire chain structure, in place of the simple connecting link 11 between two of the transverse tread members 6, a link 14 is employed and pivoted only at its non-slotted end to one of the arms 10, the link 14 being slotted longitudinally from its pivoted end to a point near its opposite or free end. A tension lever 15 is pivoted by one end to the opposed arm 10 and is bent back upon itself near its pivoted end so that when the tension lever 15 is passed through the slotted link 14 and then drawn back toward the underside of the arm 10 to which it is pivoted, the slotted link 14 will be drawn in this direction and the tire chain thus tightened on that side of the tire 8 and wheel 9. The tension lever 15 has a bent back free end 16 with which is engaged the loop 17 pivoted to the other arm 10 of the transverse tread member 6 by which the tension lever 15 is carried, so that the tension lever 15 may be readily locked in its closed or functioning position after being passed through the slotted link 14.

As the construction of the device has thus been described in detail, brief reference is now had to its use and modus operandi: The tire chain structure is adjusted on the tire 8 and wheel 9 and securely fastened thereon with the tread members 6 extending across the tread portion of the tire 8 in equally spaced and parallel relation. With the tread chain tightened and securely fastened on both sides of the tire 8 and wheel 9, the transverse tread members 6 are firmly held in position across the tread of the tire 8 with one flat face of each transverse tread member 6 firmly contacting with the tire 8 from one end of the transverse tread member 6 to the other end thereof. Owing to the tread members 6 having the corner projections 7 near one end, the outer or working edge thereof increases in height gradually from the other end toward the corner projections, providing an increasing surface gripping portion for each transverse tread member 6 from its small end across the tread of the tire and to one side thereof, thus assuring a more effective gripping on the surface to the side of the wheel and thus reducing to the minimum liability of side skidding of the wheel 9.

From the foregoing description taken in connection with the accompanying drawing it will be manifest that a tire chain is provided that will fulfill all the necessary requirements of such a device but as many changes could be made in the above description and many apparently widely different embodiments of our invention may be constructed within the scope of the appended claims without departing from the spirit or scope thereof, it is intended that all matters contained in the said accompanying specification and drawing, shall be interpreted as illustrative and not in a limited sense.

Having thus described our invention, what we claim as new and desire to secure by Letters Patent is:—

1. A tire chain including transverse tread members of angular form in cross section with the surface engaging edge rising in one direction across the tire tread and extended to form an angular extension at one side of the tire tread and near one end of said tread members; side tire chain structures for connecting the ends of said tread members on opposite sides of said tire; tensioning and locking means for the said side tire chain structures on opposite sides of the tire; and means for adjusting the said side tire chain structures on the opposite sides of the tire.

2. A tire chain including transverse tread members having the tread edge thereof increasing in one direction across the tire and extended to form a side extension at one side of the tire; said tread members having flattened ends oppositely extended to form pairs of arms with their outer ends bifurcated; links for connecting the opposed arms of said tread members and forming side chain structures for the tire chain on opposite sides of the tire; adjusting means for the side chain structures; and tensioning and locking means for said side chain structures.

3. A tire chain including transverse tread members of triangular form in cross section with the outer edge increased in one direction across the tire and extended to form a side extension at one side of the tire; the ends of said tread members being flattened and extended to form oppositely directed arms; connecting links between the opposed arms of said ends of the transverse tread members; adjusting means between one pair of said arms on either side of the tire; and tensioning and locking means between the opposed arms of two of said tread members on either side of the tire.

In testimony whereof we hereunto affix our signatures.

FRANK SPIDLA. [L. S.]
FRANK J. HRABAL. [L. S.]